United States Patent Office 2,955,130
Patented Oct. 4, 1960

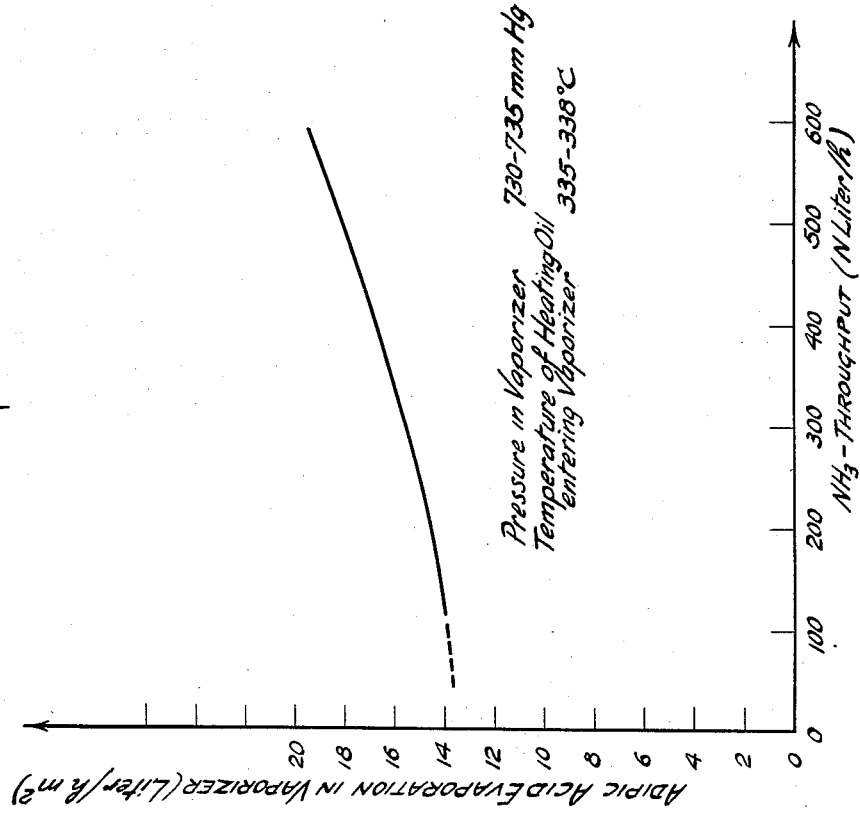
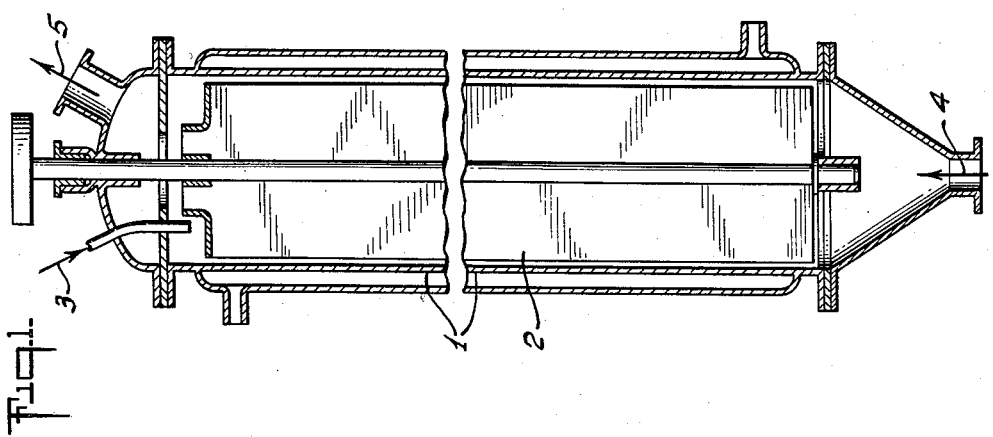

2,955,130

PREPARATION OF GAS MIXTURES SUITABLE FOR THE MANUFACTURE OF NITRILES

August Guyer, Pio Guyer, and Werner Richarz, Zurich, Switzerland, assignors to Lonza Electric and Chemical Works Ltd., Basel, Switzerland Filed June 28, 1957, Ser. No. 668,767

Claims priority, application Switzerland June 30, 1956

3 Claims. (Cl. 260—465.2)

The invention relates to improvements in the preparation of nitriles by the reaction of monocarboxylic or dicarboxylic acids with ammonia or from amides. It is particularly concerned with the preparation of adiponitrile from adipic acid and ammonia.

In the conventional procedure, adipic acid is vaporized by heating above the boiling point and reacted with ammonia at temperatures of about 420–450° C. in the presence of dehydrating catalysts to form adipodinitrile, which is used in the preparation of polyamides of the nylon type. A drawback of said method is the partial carbonization of the organic reactants and the formation of decomposition and tarry polymerization products which affect the activity of the catalyst in the nitrile preparation step proper.

According to the invention, the recited drawbacks are avoided by passing adipic acid in thin layers over heated surfaces and to heat thereon said thin layers to a temperature only which is at least about 30 to 50° C. below the boiling point of the acid and produces a vapor pressure about 10 to 50 percent below the boiling point vapor pressure; at the same time, ammonia at atmospheric or decreased pressure having a temperature of about 280 to 380° C. is passed over said heated thin layers, so as to carry off the vaporized adipic acid and to form a gas mixture which is substantially free of impurities which would affect the catalyst; said gas mixture is therefore very suitable for the conversion into the nitrile.

The novel method has the advantage that the adipic acid contacts the heat transfer surface only for a very short time at relatively low temperatures, thereby preventing substantially any decomposition. On the other hand, the thin liquid layers present a large contact face to the ammonia, and the rate of flow of the ammonia will be so adjusted that no equilibrium between the adipic acid in the liquid and vapor phase can be established.

Ammonia is applied in such amounts that the obtained mixture contains an excess of ammonia over the amount theoretically required for the formation of the nitrile. Inert gases, such as hydrogen, nitrogen, and others may be added in an amount of about 10 to 200 percent by volume of the gas mixture. The gas is preheated, preferably to a temperature which is above that of the heating surfaces but below the boiling temperature of the compound to be vaporized.

For the vaporization of the adipic acid, we use a heating agent having a temperature of about 320–340° C. for heating the heat transfer surfaces; in this way, the thin layers of adipic acid assume the optimum temperature of about 280 to 290° C. when the thickness of such layers is about 50–300µ. Under said conditions, we obtain a steady generation of vaporized adipic acid and amide, the amount of which can be controlled by the rate of flow of the ammonia. The rate of flow of the liquid adipic acid is readily adjusted, conforming to the vaporization rate.

The invention will be described more in detail with reference to the accompanying drawing, in which Fig. 1 is the elevation of an apparatus suitable for carrying out the invention, and Fig. 2 shows the effect of the rate of flow of ammonia through said apparatus on the rate of evaporation of adipic acid.

The apparatus shown in Fig. 1 comprises as essential elements a vertical cylinder 1 and a rotor 2, the blades of which rotate at a very small distance from the wall of the cylinder and distribute the liquid adipic acid introduced at 3 as a very thin film flowing downwardly along the cylinder wall. Ammonia alone, or in mixture with an inert carrier gas, is introduced through inlet 4, and the obtained ammonia-adipic acid mixture is passed through line 5 into the adiponitrile reactor (not shown).

In a stainless steel turbo film evaporator having a heating surface of about $0.3m.^2$, heated to a temperature of 320–330° C. were introduced at the top 2.5 kg. liquid adipic acid per hour, whereas at the same time gaseous ammonium preheated to 350° C. was fed from the bottom at a rate of $5m.^3$/hour. The adipic acid was almost completely gasified and the gas led into the reaction vessel where dehydration and formation thereby of adiponitrile takes place in a known manner. At the bottom of the evaporator are collected daily approximately 2 kg. of a brownish powder as residue which stands for about 3% of the introduced adipic acid.

As shown in Fig. 2 of the drawing, the adipic acid vapor output was about 14 liters per hour per sq. m. of heated surface of the vaporizer at a rate of flow of about 150 Nl per hour of $NH_3$; at increasing rates of $NH_3$ flow, the vapor output increased, and at a $NH_3$ rate of flow of about 600 Nl per hour, about 20 liters per hour per sq. m. could be vaporized. The abbreviation Nl used hereinabove designates "liter under normal conditions of pressure and temperature".

Though we have described our invention with respect to the preparation of gas mixtures forming adiponitrile, it will be understood that mixtures suitable for the preparation of other nitriles can be similarly obtained at temperatures at which the respective acid has a vapor pressure which is only 50 to 90 percent of the pressure at the boiling point of the acid. Such acids are, for instance, acetic acid, butyric acid, caproic acid, succinic acid, sebacic acid.

Instead of the acids, also the amides thereof may be used.

We claim:

1. A method of preparing adiponitrile comprising passing a film of liquid adipic acid over a heated metallic surface, heating said film to a temperature of about 280–290° C., passing ammonia over said film, said ammonia having a temperature of about 280–380° C. and being employed in an amount in excess of the amount stoichiometrically required for the formation of adiponitrile, withdrawing the thus obtained ammonia-adipic acid vapor mixture, and reacting said mixture to form adiponitrile.

2. The method as defined in claim 1, comprising heating said metallic surface to a temperature of about 320–340° C. and adjusting the rate of vaporization of said adipic acid film, so that a film temperature of about 280–290° C. is maintained.

3. The method as defined in claim 1, wherein said film of adipic acid has a thickness of about 50–300µ.

References Cited in the file of this patent

UNITED STATES PATENTS

| | | |
|---|---|---|
| 2,144,340 | Lazier | Jan. 17, 1939 |
| 2,794,043 | Jansen et al. | May 28, 1957 |

FOREIGN PATENTS

| | | |
|---|---|---|
| 537,954 | Great Britain | July 15, 1941 |